United States Patent [19]

Bauer

[11] Patent Number: 5,098,285

[45] Date of Patent: Mar. 24, 1992

[54] METHOD AND SYSTEM FOR THERMAL TREATMENT OF FINE-GRAINED MATERIAL, PARTICULARLY FOR THE MANUFACTURE OF CEMENT CLINKER

[75] Inventor: Claus Bauer, Cologne, Fed. Rep. of Germany

[73] Assignee: Kloeckner-Humboldt-Deutz Aktiengesellschaft, Fed. Rep. of Germany

[21] Appl. No.: 647,412

[22] Filed: Jan. 29, 1991

[30] Foreign Application Priority Data

Jan. 30, 1990 [DE] Fed. Rep. of Germany ....... 4002553

[51] Int. Cl.⁵ .............................................. F27B 7/02
[52] U.S. Cl. ..................................... 432/14; 432/106; 110/246
[58] Field of Search ................. 110/246; 432/105, 106, 432/14

[56] References Cited

U.S. PATENT DOCUMENTS

| | | | |
|---|---|---|---|
| 4,201,546 | 5/1980 | Herchenbach et al. | 432/106 |
| 4,295,823 | 10/1981 | Ogawa et al. | 432/106 |
| 4,299,564 | 11/1981 | Herchenbach et al. | 432/106 |
| 4,470,849 | 9/1984 | Abelitis et al. | 432/14 |
| 4,514,170 | 4/1985 | Kupper | 432/106 |
| 4,850,290 | 7/1989 | Benoit et al. | 110/246 |

Primary Examiner—Henry C. Yuen
Attorney, Agent, or Firm—Hill, Van Santen, Steadman & Simpson

[57] ABSTRACT

A method and apparatus for calcining fine grained material in the manufacture of cement clinker wherein material is preheated and partially calcined in a cyclone preheater, further partially calcined by a waste zone wherein waste material such as used tires are burned in an excess of oxygen, completely calcined in a kiln, the exhaust gases from the waste zone and kiln fed to a separate auxiliary burning zone which is supplied only with fuel and utilizes the excess oxygen from the waste zone reducing the presence of CO and the CO surges, and the heat from the burning zone is fed to the preheaters to further precalcine the material.

7 Claims, 1 Drawing Sheet

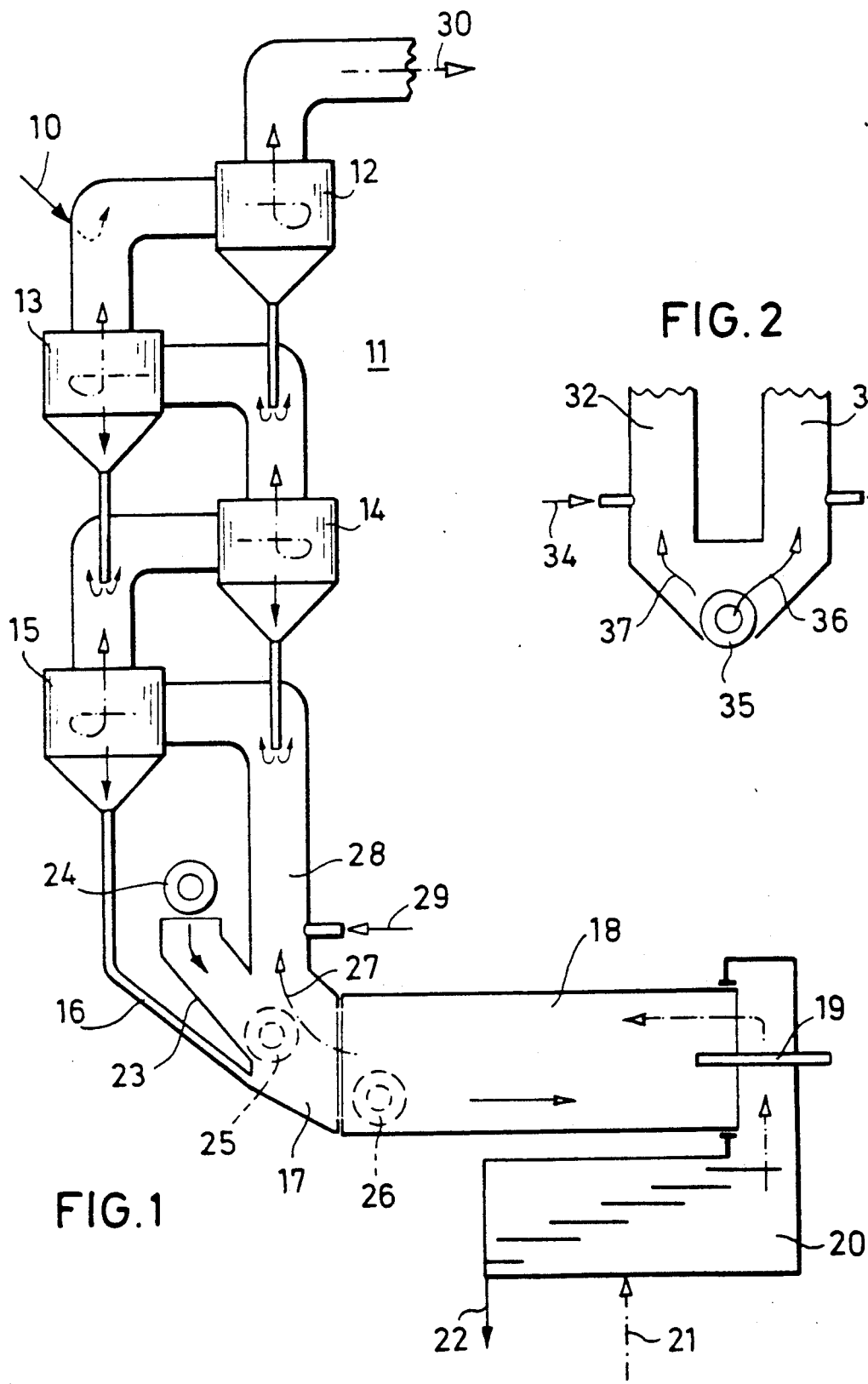

METHOD AND SYSTEM FOR THERMAL TREATMENT OF FINE-GRAINED MATERIAL, PARTICULARLY FOR THE MANUFACTURE OF CEMENT CLINKER

BACKGROUND OF THE INVENTION

The invention is directed to an improved method and apparatus for the thermal treatment of fine-grained material, particularly for the manufacture of cement clinker.

More particularly, the invention relates to a system wherein the material is first pre-heated with hot exhaust gases in a pre-heating zone, the pre-heated material is heated further by supplying and burning waste materials such as used tires and is further calcined, and the material is subsequently completely calcined to form cement clinker in the sintering zone of a rotary tubular kiln.

It is known in the manufacture of cement clinker from raw cement meal to also introduce used tires into the admission chamber of the rotary tubular kiln into which the raw meal pre-heated in the pre-heater is introduced. Thermal energy with which the raw cement meal is partially calcined before being sintered is intended to be released by burning the used tires as waste fuel. Burning used tires in the rotary tubular kiln, however, can present difficulties in the overall cement clinker production line. The used tires intermittently thrown into the admission chamber of the rotary tubular kiln should burn in the rotary tubular kiln with oxygen that must be conducted past the flame of the rotary kiln burner arranged at the opposite end of the rotary kiln in an air excess. As a consequence of the non-uniform ignition and burn-out of the tires, these burn at different rates and sometimes also burn incompletely, so that a great formation of CO occurs at times in the exhaust gas of the rotary kiln. It has also been often observed that the CO surges are measurable even though oxygen is simultaneously present in the gas flow. This leads to the conclusion that the CO content in the exhaust gas that only break down slowly. These sometimes strong CO surges in the exhaust gas of the rotary kiln can be identified following the pre-heater as seen in the direction of gas flow and they must be avoided in view of the exhaust gas scrubbing, particularly when this is composed of an electrostatic dust separator, as well as for reasons of environmental protection. In order to suppress such CO surges in the exhaust gas of the rotary kiln, the air excess at the rotary kiln burner has hitherto been increased. The flame temperature of the rotary kiln burner, however, is thereby reduced and the quantity of rotary kiln exhaust gas as well as the specific heat requirement of the cement clinker production line increases.

FEATURES OF THE INVENTION

An object of the present invention is to avoid the above-recited difficulties and to minimize the $CO_2$ surges which are found in the exhaust gas of a rotary kiln in processes heretofore used and to accomplish this without increasing the specific heat requirement of the cement clinker production line.

A further object of the invention is to provide a new and improved process and structure for preparing cement clinker wherein the utilization of heat from the burning of waste, such as used tires, is enhanced without attendant disadvantages and difficulties.

A further object of the invention is to provide a cement clinker producing equipment capable of burning waste, such as used tires, wherein variation in the supply of the used tires does not create a problem and with the supply of excess oxygen, the thermal output of the unit is actually increased.

In accord with the invention, the used tires are burned in the rotary tubular kiln with an oxygen excess. As a result, the CO surges that were hitherto observed in the exhaust gas of the rotary kiln are avoided. The oxygen excess present in the exhaust gas of the rotary kiln after burning the tires is inventively converted or consumed in an auxiliary burner unit for burning additionally supplied fuel of any and all types for enhancing the degree of calcination of the raw cement meal.

The auxiliary burner unit that is expediently fashioned as a burner segment in the rotary kiln exhaust gas conduit leading from the rotary tubular kiln to the pre-heater manages without supplying tertiary air, i.e. without connection to an otherwise standard tertiary air conduit and as a result considerable capital costs are eliminated. The oxygen excess when burning the used tires is set so high that an oxygen content of a level adequate to completely burn the fuel of the auxiliary fuels, for example coal dust, oil, gas, is present in the rotary kiln exhaust gas after burning the tires.

The fuel burned in the auxiliary burner unit can be saved at the rotary kiln burner, so that the fuel economy of the method of the invention is high despite using used tires as waste fuel.

The exhaust gas of the rotary kiln after burning the used tires and preceding the auxiliary burner unit is set to an oxygen content of approximately 3 through 4% $O_2$. Enough $O_2$ is thus always present when burning the tires so that CO does not arise. So much auxiliary fuel such as coal dust oil or gas is burned in the auxiliary burner unit which is a burner segment in the rotary kiln exhaust gas conduit, that an exhaust gas that has an oxygen content of approximately 2 through 3% $O_2$ and a carbon monoxide content of below 0.05% CO derives following the auxiliary burner unit. The CO surges that were hitherto observed are thus reduced to a minimum.

With increase in the used tire burning, the fuel delivery to the auxiliary burner unit can be increased and, thus, the down time firing can be compensated and as a result the degree of calcination of the raw cement meal can be preserved. At the same time, the quantity of fuel supplied to the rotary kiln burner can thereby be kept constant, and the kiln operation can be kept uniform as a result. The delivery of fuel to the auxiliary burner unit can be set dependent on the quantity of used tires introduced into the rotary kiln.

It is provided in a further optimization of the method to electronically regulate the auxiliary fuel with the assistance of a controlled system calculated at the system dependent on the cycle of the tire input or, respectively, to brief interrupt the tires circulating in the raw meal bed given extremely non-uniform burning behavior.

The invention is especially suitable given two-lane pre-heater systems.

In a division of the rotary kiln exhaust gases into two parallel lanes what is referred to as a twin system, in whose shared rotary tubular kiln used tires are burned, each of the two rotary kiln exhaust channels can comprise a separate auxiliary burner unit. The respective fuel supply of each unit is independently controlled dependent on the topical, current analysis of the rotary kiln exhaust gas ($O_2$, CO). In this way, both exhaust gas lanes can have their content of $O_2$ measured following the auxiliary burner unit identically set.

In special instances, the auxiliary burner unit or given twin systems can also be supplied with tertiary or extra air. This can come from the hot exhaust air of the clinker cooler that follows the rotary tubular kiln at the product delivery side.

The foregoing objects, advantages and features will become more apparent with the teaching of the principles of the invention in connection with the disclosure of the preferred embodiments thereof in the specification, claims and drawings in which:

DESCRIPTION OF THE DRAWINGS

FIG. 1 is an elevational diagrammatic view of a cement clinker production line utilizing the features of the present invention; and FIG. 2 is a fragmentary diagrammatic view of an arrangement wherein a parallel lane system is used.

DESCRIPTION OF THE PREFERRED EMBODIMENTS

According to FIG. 1, raw cement meal 10 is preheated in steps in a pre-heater 11 that comprises a plurality of cyclone units connected in series 12 through 15. The pre-heated raw cement meal 16 is introduced into the material admission chamber 17 of a rotary tubular kiln 18 that follows the pre-heater 11 at the product side. At its opposite end, the rotary tubular kiln 18 has a burner 19. The cement clinker roasted in the sintering zone of the tubular kiln 18 is cooled in the following clinker cooler 20, for example a grate cooler. 21 indicates the cooling air of the clinker cooler and 22 indicates the cooled cement clinker.

The material admission chamber 17 of the rotary tubular kiln 18 comprises a means 23 for the introduction of used tires 24. The used tires 24 are burned in the rotary tubular kiln 18 with an oxygen excess, so that a rotary kiln exhaust gas 27 having an oxygen content of approximately 3 through 4% $O_2$ derives. The rising exhaust gas main that connects the exhaust gas side of the rotary tubular kiln 18 to the material pre-heater 11 comprises a burner segment 28 for burning introduced auxiliary fuel 29 upon exploitation of the oxygen excess contained in the rotary kiln exhaust gas 27. Swirling inserts (not shown) are preferably arranged in the burner segment 28 for improved mixing of the gas with the fuel. The auxiliary fuel 29, for example coal dust, is input to the burner segment 28 finely distributed over the flow cross section and is offered the oxygen contained in the rotary kiln exhaust gas 27 for reaction without the delivery of tertiary air that is otherwise standard and is necessary at this location.

After the burning of the auxiliary fuel 29 in a temperature range from about 800° through 900° C. in the auxiliary burner unit 28, the exhaust gas has an oxygen content of approximately 2 through 3% $O_2$ and a carbon monoxide content below 0.05% CO. The exhaust gas 30 no longer contains any CO surges and can be cleaned without further risk in an electrostatic dust separator.

It is schematically shown in FIG. 2 that, given a division of the rotary kiln exhaust gases onto two parallel lanes, the two rotary kiln exhaust channels 31, 32 connected to a shared rotary tubular kiln each include an auxiliary burner unit whose respective fuel delivery 13 or, respectively, 34 is independently regulated dependent on the topical, current analysis of the rotary kiln exhaust gas. The division of the rotary kiln exhaust gas proceeding from the burning of the used tires 35 onto the two rotary kiln exhaust gas lanes 31 and 32, namely, can be unequal or asymmetrical. When, for example, the right-hand part 36 of the rotary kiln exhaust gas has a comparatively low $O_2$ content, then comparatively little auxiliary fuel 33 is burned in the auxiliary burner unit. Conversely, comparatively much auxiliary fuel 34 is burned, for example, in the other auxiliary burner unit if the left-hand sub-stream 37 of the rotary kiln exhaust gas has a higher $O_2$ content. After the burn-out of the auxiliary fuel 33 or, respectively, 34, both exhaust gas lanes 31 and 32 can be identically set in view of the exhaust gas analysis, for example to approximately 2 through 3% $O_2$, on the basis of individually controlled auxiliary fuel deliveries 33 or, respectively 34.

The invention is also illustrated by the following comparison of exhaust gas analyses:

|  | Rotary Kiln Exhaust Gas Following the Rotary Tubular Kiln 18 | Exhaust Gas Following the Lowest Cyclone 15 |
| --- | --- | --- |
| Without Burning Used Tires | Approximately 1 through 2% $O_2$ Less than 0.05% CO | Approximately 2 through 3% $O_2$ Less than 0.05% CO |
| Burning Used Tires | Approximately 1 through 2% $O_2$ 0.2 through 2% CO (Intermittent Surge) | Approximately 2 through 3% $O_2$ 0.2 through 2% CO (Intermittent Surge) |
| Invention, i.e. Burning Used Tires and With Auxiliary Burner Units 28, 29 | 3 through 4% $O_2$ Less than 0.1% CO | 2 through 3% $O_2$ Less than 0.05% CO |

According to FIG. 1, the total heat offered can be distributed in the following way onto the three combustion locations of the cement clinker production line:

| Rotary tubular kiln 19: | 80% |
| --- | --- |
| Burning Used Tires: | 10% through 15% |
| Auxiliary Burner Unit 28, 29: | 5% through 10% |

Thus, it will be seen that there has been provided an improved method and apparatus for the process of cement clinker which achieves improved thermal efficiency and eliminates undesirable surges in carbon monoxide. Variations and modifications within the spirit and scope of the invention may be provided.

I claim as my invention:

1. A method for the thermal treatment of fine grained material in the manufacture of cement clinker comprising the steps;
   preheating pulverulent calcinable material in a preheating zone with hot exhaust gases to partially calcine the material;
   further heating the material with a combustible waste material such as used tires to further partially calcine the material and burning said waste material in an excess of oxygen;

passing the material to a rotary tubular kiln for completion of the calcining;

passing the exhaust gases from the waste burning to an auxiliary burner unit supplied with fuel and utilizing said excess oxygen and utilizing the heat of the auxiliary burner to further precalcine the material;

and supplying said excessive oxygen to the waste material in an amount such that the oxygen content of the exhaust gas from the waste burning at a location following the auxiliary burner unit has an oxygen content in the range of 2% through 3% oxygen.

2. A method for thermal treatment of fine grained material in the manufacture of cement clinker comprising the steps:

preheating pulverulent calcinable material in a preheating zone with hot exhaust gases to partially calcine the material;

further heating the material with a combustible waste material such as used tires to further partially calcine the material and burning said waste material in an excess of oxygen;

passing the material to a rotary tubular kiln for completion of the calcining;

passing the exhaust gases from the waste burning to an auxiliary burner unit supplied with fuel and utilizing said excess oxygen and utilizing the heat of the auxiliary burner to further precalcine the material;

and supplying said excess of oxygen to the waste material in an amount such that the oxygen content of the exhaust gas from the waste burning preceding the auxiliary burner unit has an oxygen content of above 3% oxygen.

3. A method for the thermal treatment of fine grained material in the manufacture of cement clinker in accordance with the steps of claim 1:

wherein the fuel supplied to the auxiliary burner unit is controlled as a function of the quantity of combustible waste material burned.

4. A method for the thermal treatment of fine grained material in the manufacture of cement clinker in accordance with the steps of claim 1:

wherein the quantity of fuel supplied to the auxiliary burner unit is varied as a function of the heat output of the combustible waste material.

5. A method for the thermal treatment of fine grained material in the manufacture of cement clinker in accordance with the steps of claim 1:

wherein the quantity of fuel supplied to the auxiliary burner unit is reduced and interrupted as a function of the input of the combustible waste material.

6. A method for the thermal treatment of fine grained material in the manufacture of cement clinker in accordance with the steps of claim 1:

wherein the exhaust gases from the waste burning are fed to two separate parallel auxiliary burner units each supplied with fuel delivery independently controlled as a function of the analysis of the exhaust gas from the rotary tubular kiln.

7. A method for the thermal treatment of fine grained material in the manufacture of cement clinker in accordance with the steps of claim 1:

wherein the auxiliary burning zone is operated at a temperature in the range of 800° to 900° C.

* * * * *